(12) United States Patent
Huang et al.

(10) Patent No.: US 8,840,334 B2
(45) Date of Patent: Sep. 23, 2014

(54) TILTABLE LINKAGE MECHANISM

(75) Inventors: Che-Hung Huang, Taoyuan County (TW); Ta-Wei Liu, Taoyuan County (TW)

(73) Assignee: HTC Corporation (TW)

( * ) Notice: Subject to any disclaimer, the term of this patent is extended or adjusted under 35 U.S.C. 154(b) by 329 days.

(21) Appl. No.: 13/184,624

(22) Filed: Jul. 18, 2011

(65) Prior Publication Data

US 2012/0195677 A1    Aug. 2, 2012

(30) Foreign Application Priority Data

Jan. 27, 2011    (TW) .............................. 100103049 A (51) Int. Cl.
*F16D 1/12* (2006.01)
*H04M 1/02* (2006.01)
(52) U.S. Cl.
CPC ............ *H04M 1/0237* (2013.01); *H04M 1/022* (2013.01)
USPC .................... 403/329; 455/575.1; 361/679.55
(58) Field of Classification Search
USPC .................. 403/83, 84, 85; 16/357, 360, 361; 361/679.09, 679.12, 679.27, 679.56; 455/575.3, 575.4
See application file for complete search history.

(56) References Cited

U.S. PATENT DOCUMENTS

| | | | | |
|---|---|---|---|---|
| 5,633,782 | A | * | 5/1997 | Goodman et al. ........ 361/679.41 |
| 5,746,410 | A | * | 5/1998 | Hung ......................... 248/441.1 |
| 6,003,831 | A | * | 12/1999 | Coleman ....................... 248/688 |
| 6,464,195 | B1 | * | 10/2002 | Hildebrandt ................. 248/460 |
| 7,001,088 | B2 | * | 2/2006 | Hui-hu .......................... 400/681 |
| 7,545,637 | B2 | * | 6/2009 | Liu ........................... 361/679.56 |
| 7,586,743 | B2 | * | 9/2009 | Lin ........................... 361/679.55 |
| 7,762,519 | B2 | * | 7/2010 | Kunii et al. ................... 248/688 |

(Continued)

FOREIGN PATENT DOCUMENTS

| | | |
|---|---|---|
| CN | 101346889 A | 1/2009 |
| EP | 1773031 A1 | 4/2007 |

(Continued)

OTHER PUBLICATIONS

Office Action for Japanese Application No. 2011-179156, dated Mar. 5, 2013, with partial English translation.

(Continued)

*Primary Examiner* — Michael P Ferguson
*Assistant Examiner* — Daniel Wiley
(74) *Attorney, Agent, or Firm* — Cantor Colburn LLP (57) ABSTRACT

A tiltable linkage mechanism including a first plate, a second plate, a swinging plate, a first hinge, a second hinge and a third hinge is provided. The first plate includes an upper surface, the second plate includes a bottom surface facing the upper surface of the first plate and a position limiting structure disposed on the bottom surface. The position limiting structure further has two opposite clamping surfaces. The first plate and the second plate pivotally connect with each other through the first hinge. The swinging plate and the first plate pivotally connect with each other through the second hinge. The swinging plate and the second plate pivotally connect with each other through the third hinge which is disposed in the position limiting structure. The third hinge has an end portion that can slide between the two clamping surfaces. In this way, when the second plate tilts from the first plate, the second plate rotates about the first hinge, the swinging plate rotates about the second hinge, and the end portion of the third hinge slides within the position limiting structure.

8 Claims, 11 Drawing Sheets

(56) References Cited

U.S. PATENT DOCUMENTS

| | | | |
|---|---|---|---|
| 7,770,864 B2* | 8/2010 | Phifer et al. | 248/455 |
| 7,925,310 B2* | 4/2011 | Chiu | 455/575.1 |
| 8,081,449 B2* | 12/2011 | Lin et al. | 361/679.56 |
| 8,199,475 B2* | 6/2012 | Yeh et al. | 361/679.27 |
| 8,332,001 B2* | 12/2012 | Guo | 455/575.4 |
| 8,339,783 B2* | 12/2012 | Wu et al. | 361/679.56 |
| 8,346,322 B2* | 1/2013 | Yoon | 455/575.4 |
| 8,360,382 B2* | 1/2013 | Wu et al. | 248/371 |
| 2005/0121594 A1* | 6/2005 | Kuo | 248/676 |
| 2006/0108494 A1* | 5/2006 | Lancet | 248/456 |
| 2007/0082695 A1* | 4/2007 | Yoon et al. | 455/550.1 |
| 2008/0161075 A1* | 7/2008 | Kim et al. | 455/575.4 |
| 2010/0301187 A1* | 12/2010 | Peet | 248/447 |
| 2011/0031287 A1* | 2/2011 | Le Gette et al. | 224/101 |
| 2011/0165914 A1 | 7/2011 | Guo | |
| 2011/0176261 A1 | 7/2011 | Wu et al. | |
| 2012/0178508 A1* | 7/2012 | Yoo et al. | 455/575.4 |

FOREIGN PATENT DOCUMENTS

| | | |
|---|---|---|
| JP | 62-27168 U | 2/1987 |
| JP | 2005-61559 A | 3/2005 |
| TW | M359633 U | 6/2009 |

OTHER PUBLICATIONS

Extended European Search Report for Application No. 11193298.4-1246, dated Feb. 24, 2012.

Office Action for Japanese Application No. 2011-179156, dated Oct. 29, 2013, with partial English translation.

Office Action for Taiwanese Application No. 10320482380, dated Apr. 10, 2014, with partial English translation.

Office Action for the Chinese Patent Application No. CN201110050816.1, dated Apr. 2, 2014. Partial English translation attached.

* cited by examiner

TILTABLE LINKAGE MECHANISM

CROSS-REFERENCES TO RELATED APPLICATIONS

This application claims priority to Taiwan Patent Application No. 100103049 filed on Jan. 27, 2011.

BACKGROUND OF THE INVENTION

1. Field of the Invention

The present invention relates to a tiltable linkage mechanism, and more particularly, to a tiltable linkage mechanism having a position limiting structure.

2. Descriptions of the Related Art

Hand-held devices (e.g., mobile phones, notebook computers, portable game consoles and the like) with a display often have a display and a body thereof connected through a hinge structure, which is formed by a spring and a cam in combination to allow the display to rotate with respect to the body.

As hand-held devices have developed towards a thinner profile, both the electronic elements and mechanical elements of the hand-held devices, as well as the hinge structure, need to have a significantly reduced volume. However, when the hinge structure is made to have a reduced volume, the cam in the hinge structure is liable to wear and tear after an extended time period of use, resulting in a reduced reliability of the hinge structure. Furthermore, the reduction in volume of the cam will cause difficulty in the production of the cam and, consequently, increase the production cost of the cam. As can be known from the above, the hinge structure is not suitable for thinned electronic products.

Figure 11:
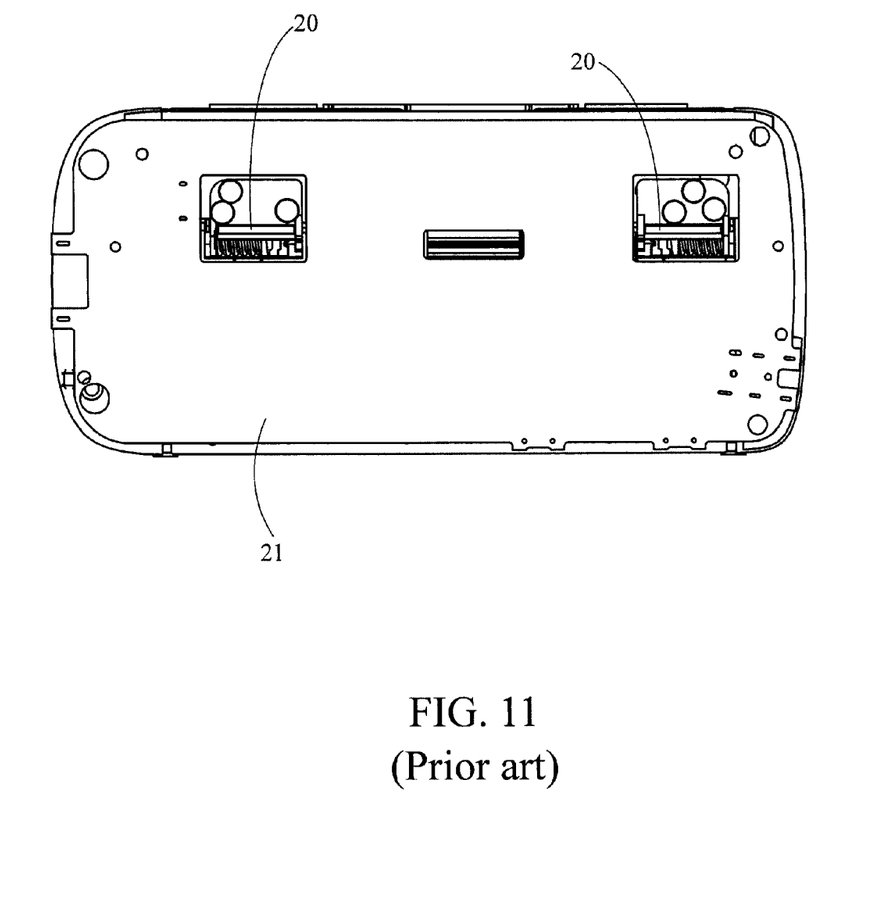
FIG. 11 is a top plane view of a conventional hinge structure combined with a circuit board.

FIG. 11 illustrates further shortcomings of the hinge: when the conventional hinge structure 20 is combined with the circuit board 21 of a hand-held device, the hinge structure 20 will occupy a large space on the circuit board 21. As a result, the space of the circuit board 21 occupied by the hinge structure 20 becomes unavailable for other electronic elements to be disposed thereon, and hinders the reduction in the volume of the circuit board 21. As this makes it difficult to reduce the volume of the circuit board 21, it is also difficult to thin the hand-held device.

In view of this, an urgent need exists in the art to provide a linkage mechanism between a display and a body that is suitable for thinning a hand-held device.

SUMMARY OF THE INVENTION

An objective of the present invention is to provide a tiltable linkage mechanism, which can connect two objects, such that one of the two objects can be tilted and closed with respect to the other.

Another objective of the present invention is to provide a tiltable linkage mechanism, which can have its volume reduced easily and thus is suitable for thinning a hand-held device.

To achieve the aforesaid objectives, the present invention discloses a tiltable linkage mechanism, which comprises a first plate, a second plate, a swinging plate, a first hinge, a second hinge and a third hinge. The first plate includes a first upper surface and a first bottom surface opposite to the first upper surface; the second plate includes a second upper surface, a second bottom surface opposite to the second upper surface, and a position limiting structure, wherein the second bottom surface faces towards the first upper surface of the first plate, and the position limiting structure is disposed on the second bottom surface and has two opposite clamping surfaces; the first hinge is pivotally connected with the second plate and the first plate; the second hinge is pivotally connected with the swinging plate and the first plate; and the third hinge is disposed within the position limiting structure to pivotally connect with the swinging plate and the second plate, wherein the third hinge has an end portion slidably clamped by the two clamping surfaces.

Thereby, when the second plate is tilted from the first plate, the second plate rotates about the first hinge, the swinging plate rotates about the second hinge, and the end portion of the third hinge slides within the position limiting structure from a first position to a second position.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
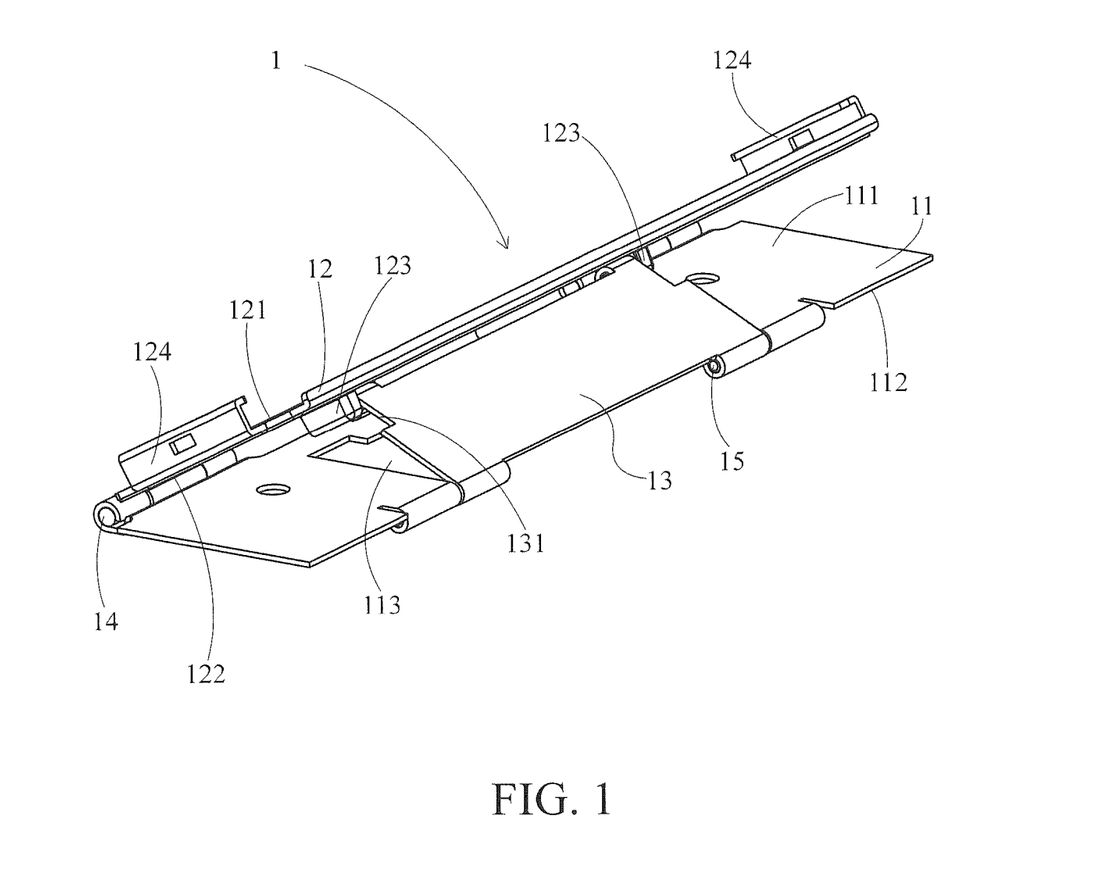
FIG. 1 is a perspective assembly view of the first preferred embodiment of a tiltable linkage mechanism of the present invention in a tilted state.
Figure 2:
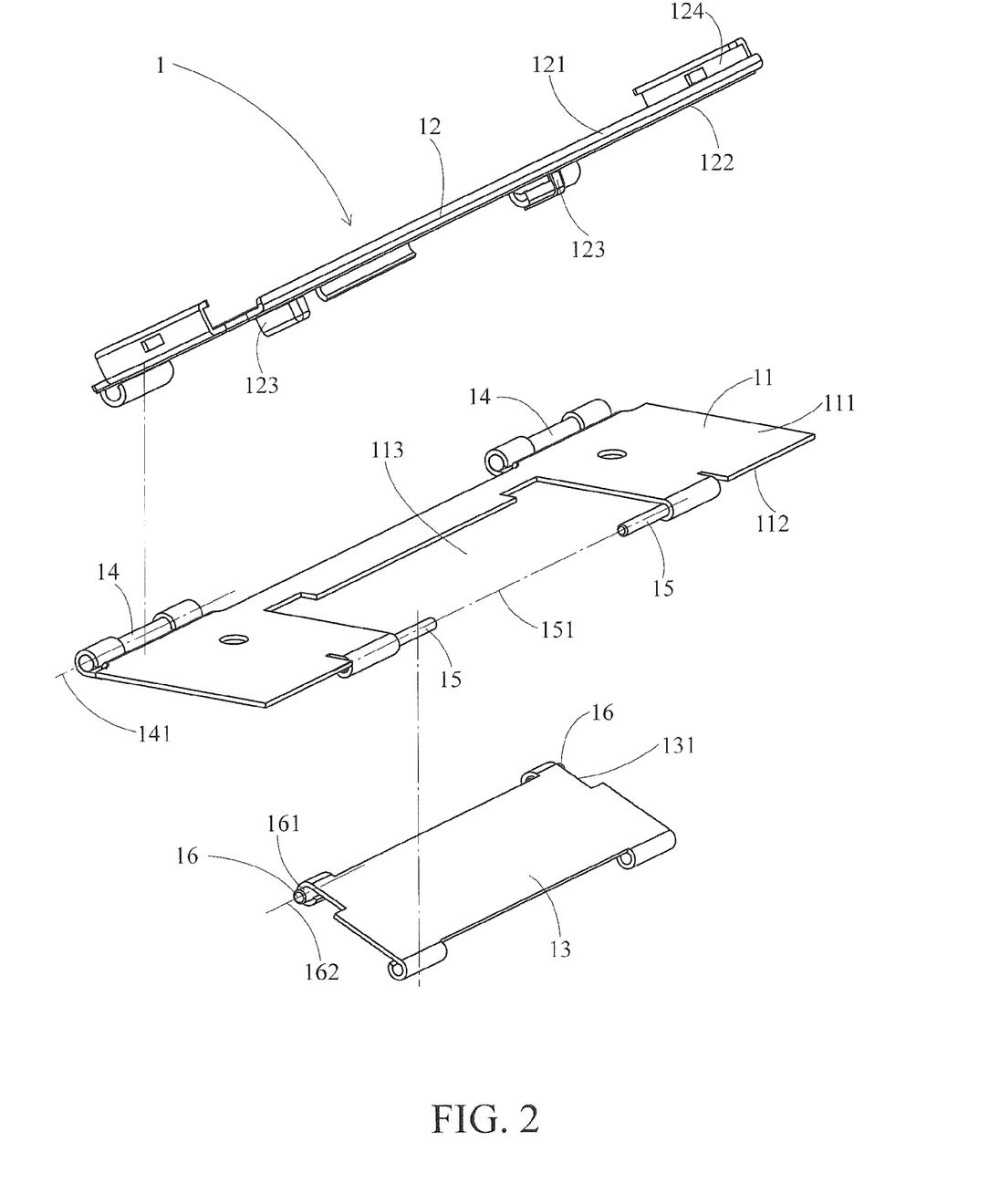
FIG. 2 is a perspective exploded view of the first preferred embodiment of the tiltable linkage mechanism of the present invention in the tilted state.

FIG. 1 illustrates a perspective assembly view, while FIG. 2 illustrates a perspective exploded view of the first preferred embodiment of a tiltable linkage mechanism of the present invention in a tilted state. The tiltable linkage mechanism 1 comprises a first plate 11, a second plate 12, a swinging plate 13, a first hinge 14, a second hinge 15 and a third hinge 16. Hereinafter, the individual parts of the tiltable linkage mechanism 1 will be described in sequence.

The first plate 11 is adapted to connect with some other element of the tiltable linkage mechanism (e.g., a lower half of a body of a hand-held device), and usually has an input device (e.g., a physical QWERTY keyboard) thereon. The first plate 11 may be a plate-shaped structure, and comprises a first upper surface 111, a first bottom surface 112 opposite to the first upper surface 111, and a notch 113. The notch 113 extends from the first upper surface 111 to the first bottom surface 112, and is used to receive the swinging plate 13.

The second plate 12 is adapted to connect with some other element of the tiltable linkage mechanism (e.g., an upper half of the body of the hand-held device), and usually has a display thereon for displaying relevant information to the user and interacting with the user (e.g., the display has a touch input function). The second plate 12 may also be a plate-shaped structure, and comprises a second upper surface 121, a second bottom surface 122 opposite to the second upper surface 121, and two symmetrical position limiting structures 123. The second bottom surface 122 faces the first upper surface 111 of the first plate 11.

Figure 3:
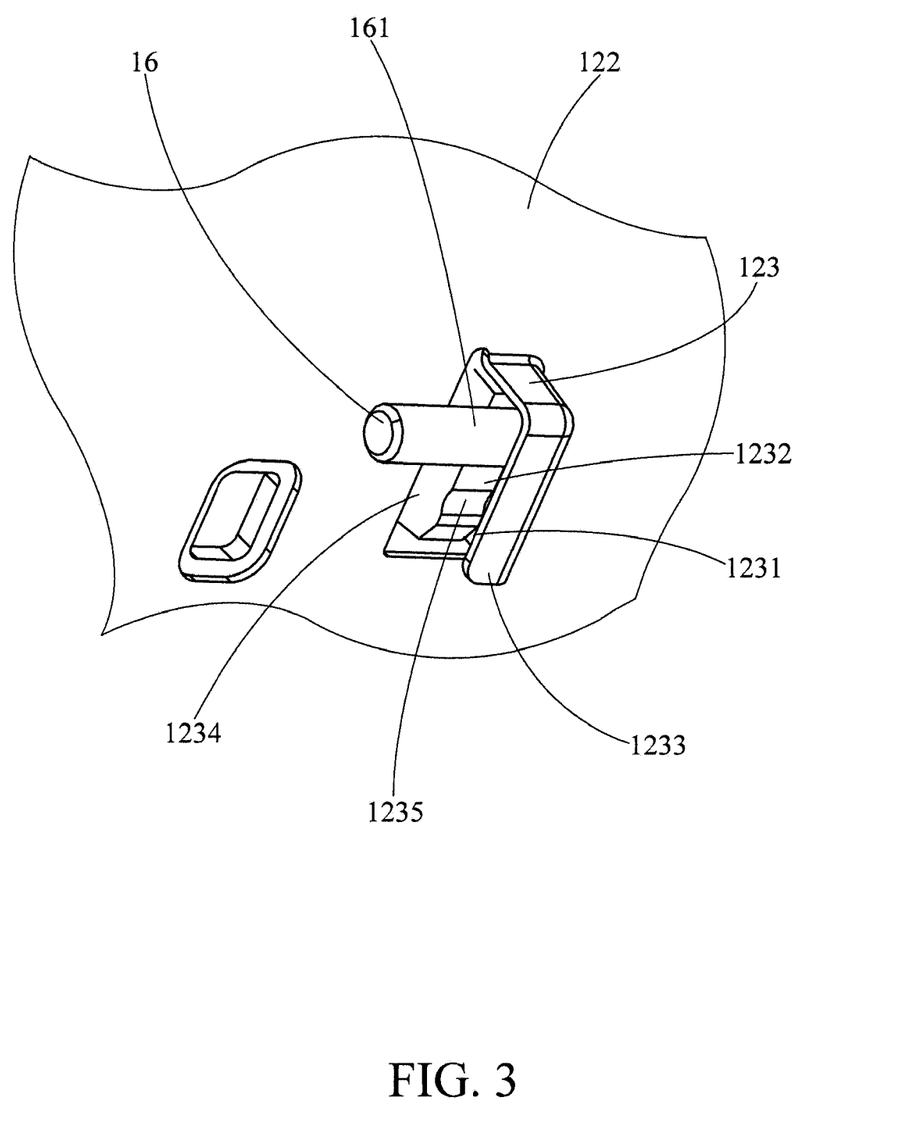
FIG. 3 is an enlarged detailed view of a position limiting structure and an end portion of a third hinge of the tiltable linkage mechanism of the present invention.

In reference to FIG. 3, the two position limiting structures 123 are fixedly disposed on the second bottom surface 122, and each comprise two clamping surfaces 1231, 1232, which are separated from each other and placed facing each other to define a clamping space; the position limiting structures 123 are of an inverted-U-shaped configuration. The two clamping surfaces 1231, 1232 may be formed in various ways, and in this embodiment, are formed by a cantilever plate 1233 and a protrusion 1234. In detail, the position limiting structure 123 comprises the cantilever plate 1233 and the protrusion 1234 which are separated from each other. The cantilever plate 1233 can integrally extend from the second bottom surface 122, while the protrusion 1234 is fixed on the second bottom surface 122. The cantilever plate 1233 forms the clamping surface 1231, while the protrusion 1234 forms the clamping surface 1232.

Furthermore, one of the two clamping surfaces 1231, 1232 may be formed with a plurality of stopping grooves 1235 for receiving and position-limiting an end portion 161 of the third hinge 16 (described below). In this embodiment, there are two stopping grooves 1235 that are formed on the clamping surface 1232 of the protrusion 1234. The stopping grooves 1235 can provide the user with a more distinct "click" feeling when the user operates the aforesaid tiltable linkage mechanism.

In reference to FIGS. 1 and 2 again, the swinging plate 13 is also a plate-shaped structure, and the shape thereof may correspond to a profile of the notch 113 of the first plate 11. In addition, the swinging plate 13 may have two symmetrical notches 131, which are concavely disposed on the left side and right side of the swinging plate 13 and extend to the front side of the swinging plate 13 respectively. The notches 131 are adapted to receive the position limiting structures 123.

The first plate 11, the second plate 12 and the swinging plate 13 described above are connected with each other through the first hinge 14, the second hinge 15 and the third hinge 16, which will be described hereinafter.

In detail, the first hinge 14 can pivotally connect with the second plate 12 and the first plate 11 so that the second plate 12 can rotate about the first hinge 14 with respect to the first plate 11. The second hinge 15 can pivotally connect with the swinging plate 13 and the first plate 11 so that the swinging plate 13 can rotate about the second hinge 15 with respect to the first plate 11. The third hinge 16 can be disposed within the position limiting structure 123 to pivotally connect with the swinging plate 13 and the second plate 12 so that the swinging plate 13 can rotate about the third hinge 16 with respect to the second plate 12 (and the position limiting structure 123).

In reference to FIG. 3 again, the third hinge 16 has an end portion 161, which has a diameter larger than the distance between the two clamping surfaces 1231, 1232. The end portion 161 extends into the clamping space formed by the two clamping surfaces 1231, 1232 and is thus clamped by the two clamping surfaces 1231, 1232. Furthermore, as the swinging plate 13 rotates with respect to the position limiting structure 123, the end portion 161 can slide between the two clamping surfaces 1231, 1232. In other words, the end portion 161 of the third hinge 16 is slidably clamped between the two clamping surfaces 1231, 1232.

It shall be noted that the third hinge 16 may be made of metal, and the protrusion 1234 of the position limiting structure 123 may be made of an elastic material (e.g., plastic). Therefore, when the end portion 161 of the third hinge 16 slides between the two clamping surfaces 1231 and 1232, the end portion 161 and the clamping surface 1232 may experience a reduced friction force therebetween due to the difference of materials. In addition, the cantilever plate 1233 of the position limiting structure 123 may be made of metal to enhance the flexibility and structural strength of the cantilever plate 1233.

It shall also be noted that a connecting position between the first hinge 14 and the first plate 11, a connecting position between the first hinge 14 and the second plate 12, a connecting position between the second hinge 15 and the first plate 11, a connecting position between the second hinge 15 and the swinging plate 13, and a connecting position between the third hinge 16 and the swinging plate 13 all have an influence on the rotation range of both the second plate 12 and the swinging plate 13, and thus, need to be designed depending on actual requirements.

In this embodiment, the connecting position between the first hinge 14 and the first plate 11 is located on the front side of the first plate 11; the connecting position between the first hinge 14 and the second plate 12 is located on the front side of the second plate 12; the connecting position between the second hinge 15 and the first plate 11 is located on the rear side of the first plate 11; the connecting position between the second hinge 15 and the swinging plate 13 is located on the rear side of the swinging plate 13; and the connecting position between the third hinge 16 and the swinging plate 13 is located on the front side of the swinging plate 13.

Further, it shall be noted that the first hinge 14 is defined with a first axis 141, the second hinge 15 is defined with a second axis 151, and the third hinge 16 is defined with a third axis 162. Preferably, the first axis 141, the second axis 151 and the third axis 162 are substantially parallel to each other, so that the second plate 12 and the swinging plate 13 can rotate more smoothly.

Next, the method in which the tiltable linkage mechanism 1 operates will be described.

Figure 4:
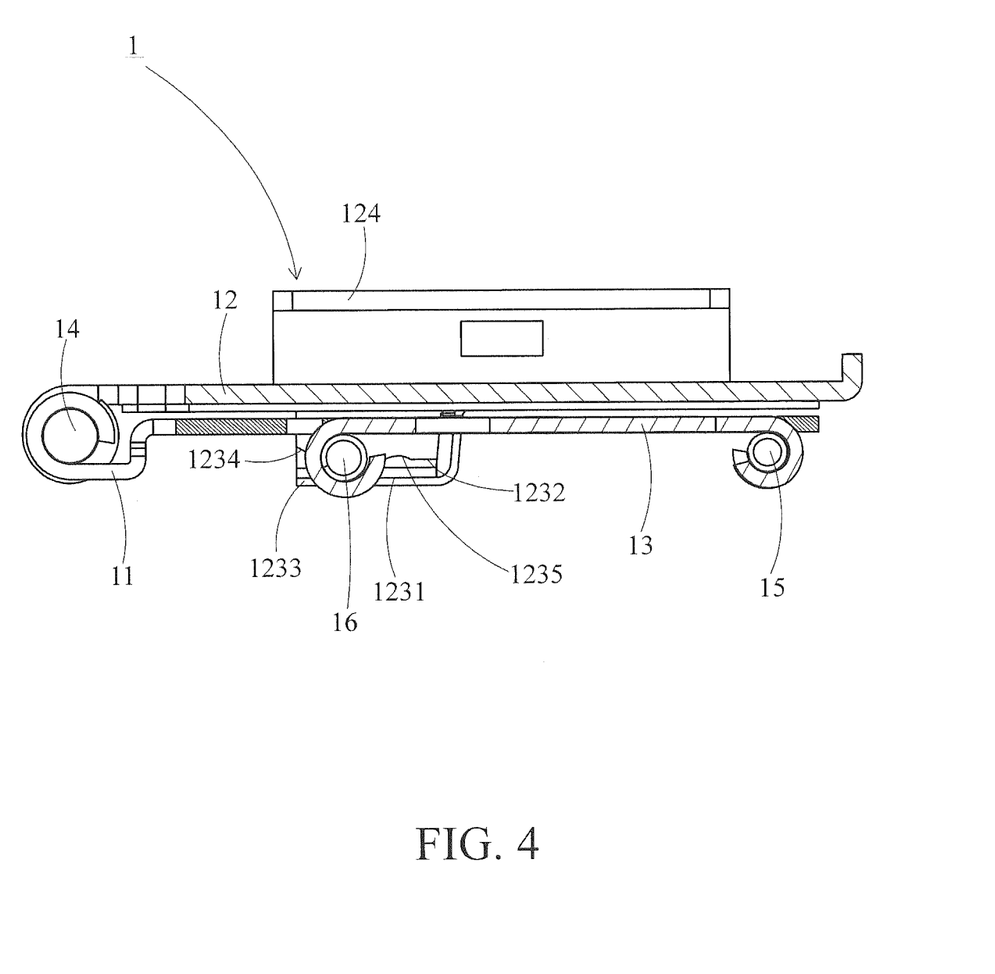
FIG. 4 is a schematic plane view of the first preferred embodiment of the tiltable linkage mechanism of the present invention in a closed state.
Figure 5:
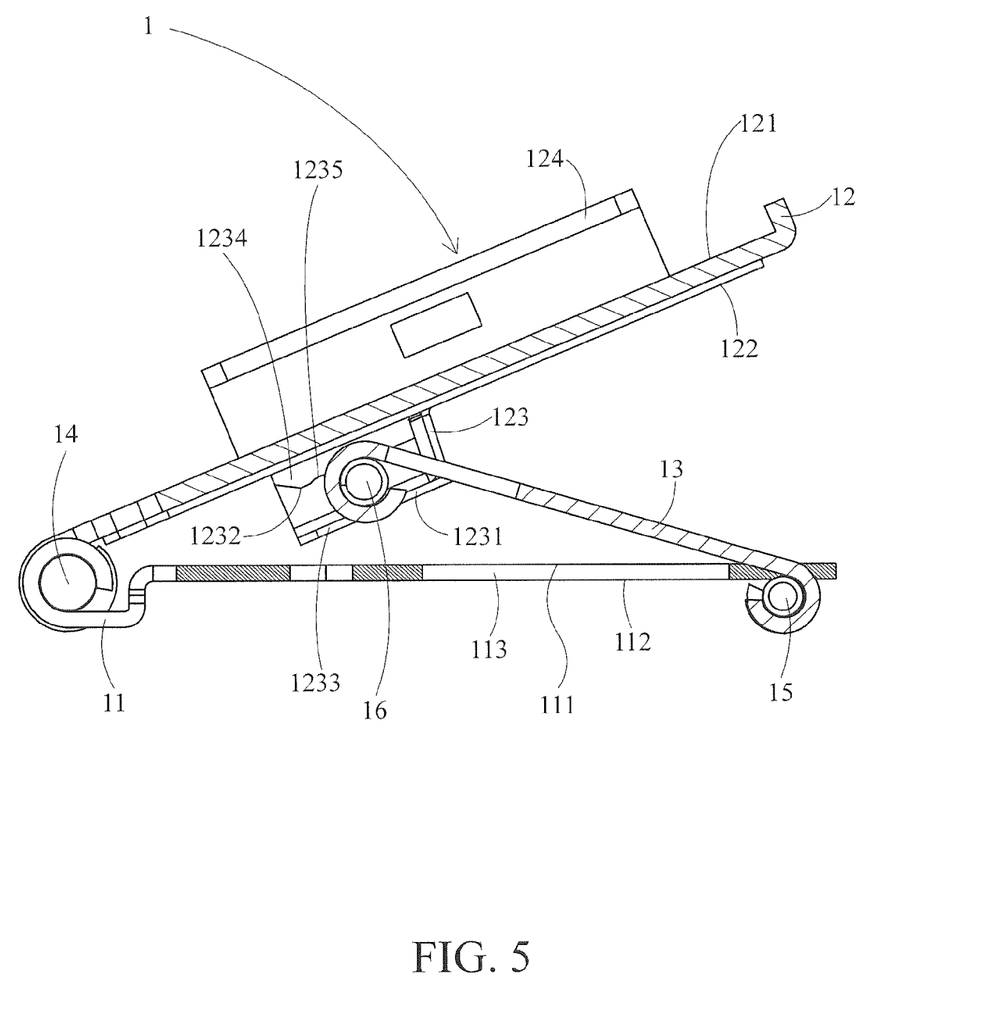
FIG. 5 is a schematic plane view of the first preferred embodiment of the tiltable linkage mechanism of the present invention in the tilted state.
Figure 6:
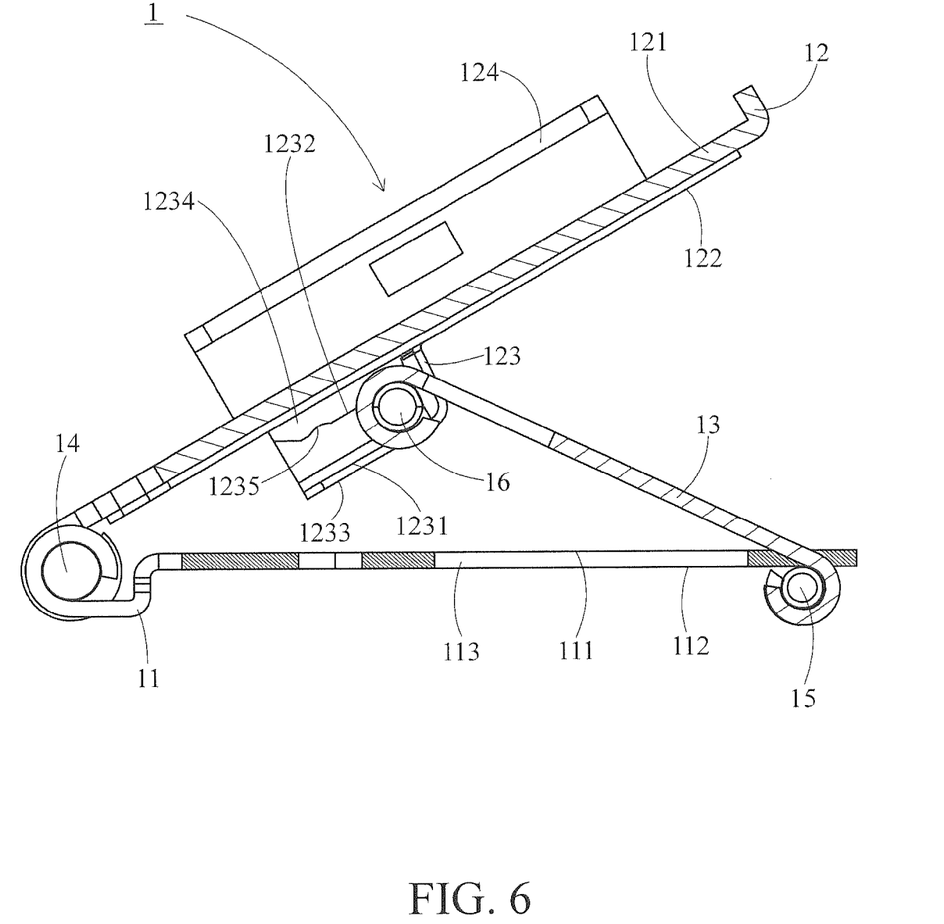
FIG. 6 is another schematic plane view of the first preferred embodiment of the tiltable linkage mechanism of the present invention in the tilted state.

In reference to FIGS. 4 to 6, there are schematic views illustrating the operations of the tiltable linkage mechanism of the first preferred embodiment of the present invention respectively. The tiltable linkage mechanism 1 may be considered as a linkage mechanism with one degree of freedom. When the second plate 12 rotates about the first hinge 14 with respect to the first plate 11, the swinging plate 13 will rotate about the second hinge 15 with respect to the first plate 11 simultaneously. At this point, the second plate 12 and the swinging plate 13 also rotate with respect to each other, and, as a result, the end portion 161 of the third hinge 16 slides within the position limiting structure 123.

Figure 7:
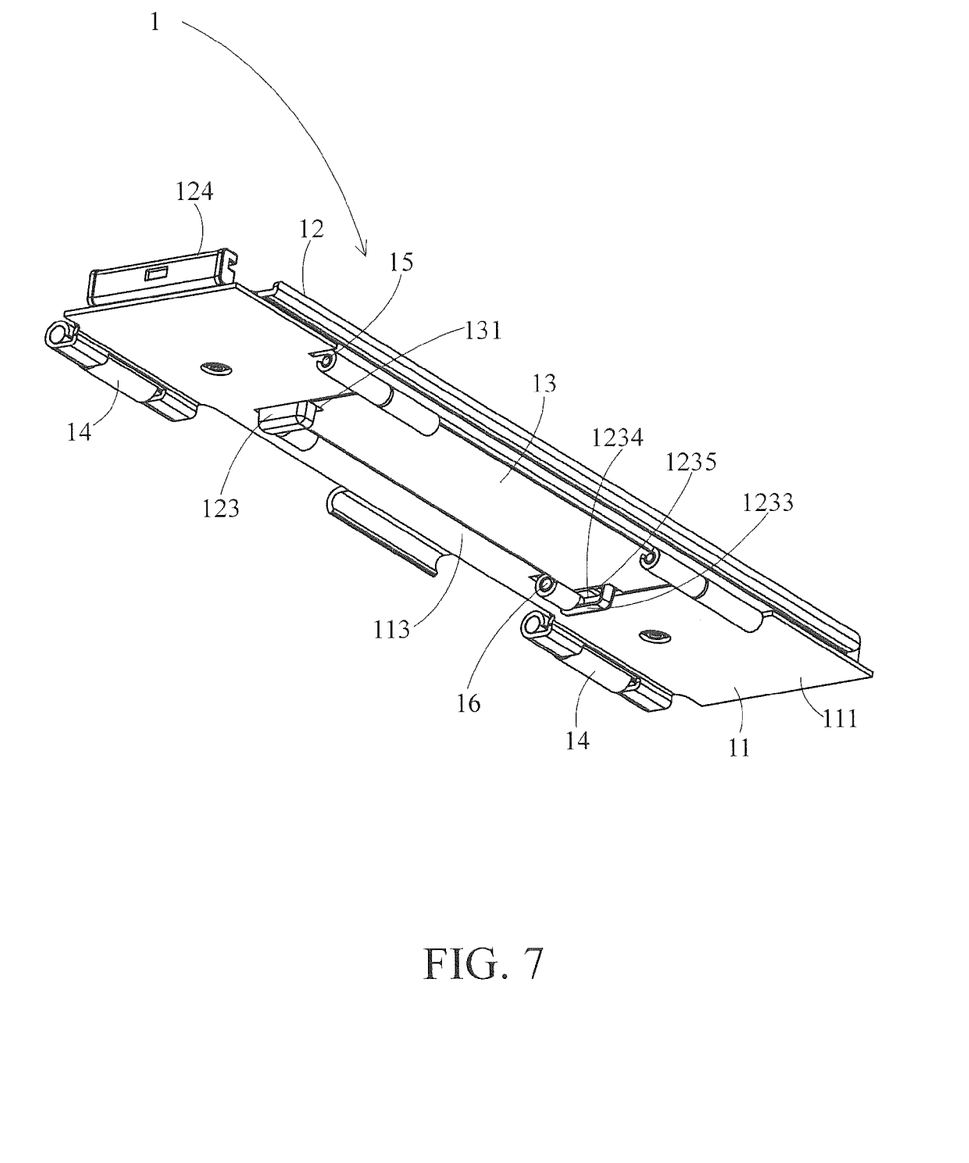
FIG. 7 is a schematic perspective view of the first preferred embodiment of the tiltable linkage mechanism of the present invention in the closed state.

Because the second plate 12 and the swinging plate 13 have different rotation angles, the tiltable linkage mechanism 1 may have at least two states, i.e., a closed state and a tilted state. In the closed state (as shown in FIG. 4 and FIG. 7), the second plate 12 is piled on the first plate 11 and the swinging plate 13; the swinging plate 13 is received in the notch 113 of the first plate 11, and the position limiting structure 123 and the end portion 161 of the third hinge 16 are received in the notch 131 of the swinging plate 13. At this point, the end portion 161 of the third hinge 16 is located at a first position within the position limiting structure 123, just right in one of the stopping grooves 1235.

When the second plate 12 is tilted from the first plate 11 under a force applied by the user, the tiltable linkage mechanism 1 instantly switches into the tilted state (as shown in FIG. 5). At this point, the second plate 12 is slanted with respect to the first plate 11, and the end portion 161 of the third hinge 16 leaves the first position (the stopping groove 1235). If the user stops applying force, then the end portion 161 of the third hinge 16 is clamped and positioned by the position limiting structure 123; as a result, the end portion 16 will not slide randomly within the position limiting structure 123, so that the second plate 12 can be maintained in the tilted state.

The second plate 12 can be tilted continuously so that the second plate 12 becomes more slanted with respect to the first plate 11 (as shown in FIG. 6). At this point, the end portion 161 of the third hinge 16 slides to a second position within the position limiting structure 123, just right in one of the other stopping grooves 1235.

In actual application, the first plate 11 and the second plate 12 of the tiltable linkage mechanism 1 may connect with other elements of the tiltable linkage mechanism (e.g., a body and a display (not shown) of a hand-held device) respectively. Thus, when the second plate 12 is tilted from the first plate 11, the display will also be tilted from the body of the hand-held device.

Figure 8:
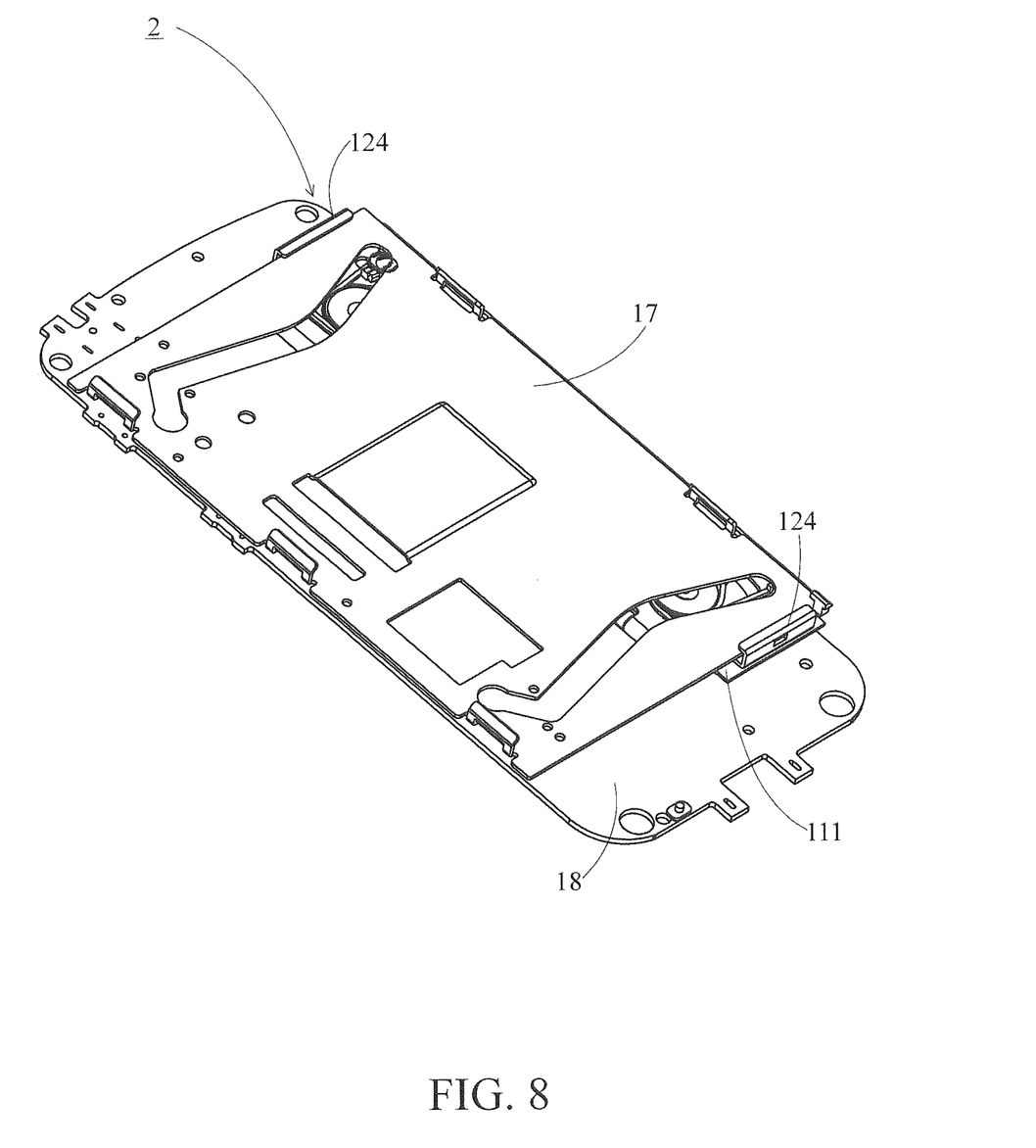
FIG. 8 is a perspective assembly view of the second preferred embodiment of a tiltable linkage mechanism of the present invention in the tilted state.
Figure 9:
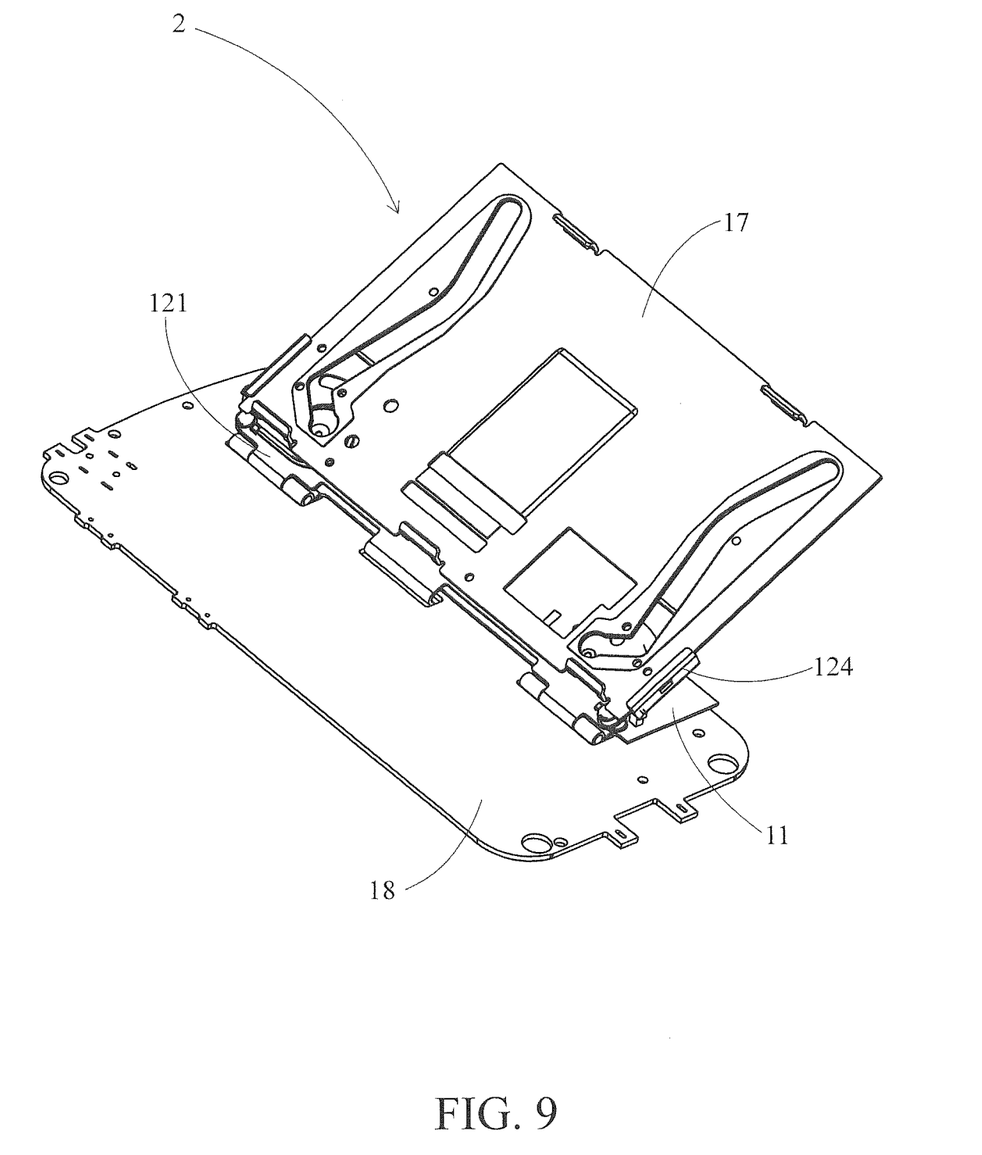
FIG. 9 is a perspective assembly view of the second preferred embodiment of the tiltable linkage mechanism of the present invention in the closed state.

FIGS. 8 and 9 illustrate perspective assembly views of the second preferred embodiment of a tiltable linkage mechanism of the present invention in the tilted state and in the closed state respectively. The tiltable linkage mechanism 2 of the second preferred embodiment differs from the tiltable linkage mechanism 1 of the first preferred embodiment in that: the tiltable linkage mechanism 2 further comprises a sliding plate 17. So, a hand-held device having the sliding plate 17 not only has the tilted state but also has a sliding state. Other elements of the tiltable linkage mechanism 2 are all similar to those of the tiltable linkage mechanism 1, and thus will not be further described herein.

The sliding plate 17 is slidably disposed on the second upper surface 121 of the second plate 12 so that the sliding plate 17 can slide with respect to the second plate 12. Furthermore, the sliding plate 17 can be tilted together with the second plate 12 with respect to the first plate 11. There are various ways to have the sliding plate 17 and the second plate 12 slide with respect to each other, and the way adopted in this embodiment is (but not limited to) as follows: additionally forming two guide rails 124 on the second upper surface 121 of the second plate 12 so that the left side and right side of the sliding plate 17 are located in the guide rails 124 respectively.

In actual application, the first plate 11 and the sliding plate 17 of the tiltable linkage mechanism 2 may connect with other elements of the tiltable linkage mechanism (e.g., a circuit board 18 and a display (not shown) of a hand-held device) respectively. Thus, the display can slide together with the sliding plate 17 with respect to the second plate 12 and the circuit board 18, and can be tilted together with the second plate 12 from the first plate 11 and the circuit board 18.

Figure 10:
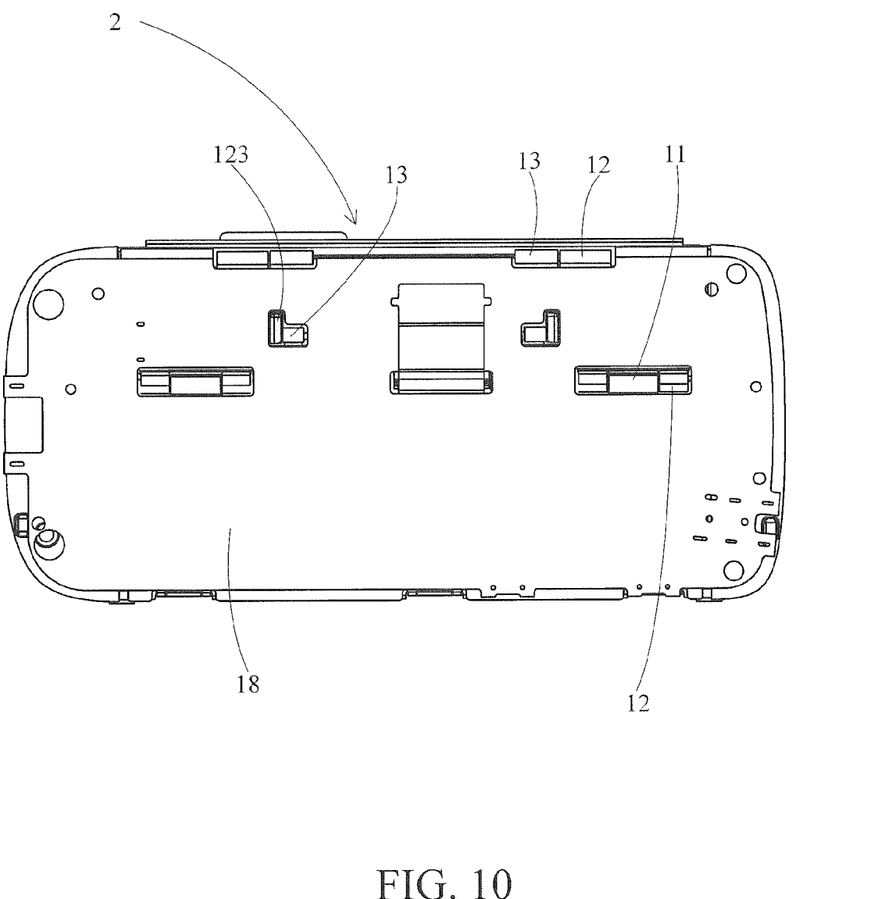
FIG. 10 is a top plane view of the second preferred embodiment of the tiltable linkage mechanism of the present invention in the closed state.

FIG. 10 illustrates a top plane view of the second preferred embodiment of the tiltable linkage mechanism of the present invention in the closed state. As can be seen from FIG. 10, when the tiltable linkage mechanism 2 is combined with the circuit board 18, the first plate 11, the second plate 12, the swinging plate 13 and the position limiting structures 123 of the tiltable linkage mechanism 2 will occupy part of the space of the circuit board 18; however, compared to the conventional hinge structure (as shown in FIG. 11), the occupied space of the circuit board 18 is reduced at least by 40%. This facilitates the reduction in volume of the circuit board 18 and further facilitates the thinning of the whole hand-held device.

The tiltable linkage mechanisms of the preferred embodiments have been described above. However, the aforesaid tiltable linkage mechanisms may still have various variants, which are listed as follows.

1. The first plate 11 may not need to be formed with the notch 113, while the swinging plate 13 may not need to be formed with the notches 131. In detail, the notch 113 and the notches 131 are used to receive the swinging plate 13 and the position limiting structures 123 respectively, so that the tiltable linkage mechanisms 1, 2 in the closed state may have a further reduced thickness. When the notch 113 and the notches 131 are omitted, the tiltable linkage mechanisms 1, 2 in the closed state will have a slightly increased thickness but can still operate smoothly.

2. In addition to the form of the cantilever plate 1233 and the protrusion 1234, the two clamping surfaces 1231, 1232 of the position limiting structure 123 may also be implemented in other ways. For example, the protrusion 1234 may be omitted, and then the second bottom surface 122 of the second plate 12 is directly used as the clamping surface 1232.

3. The position limiting structures 123, the first hinges 14, the second hinges 15 and the third hinges 16 are not just limited to two. For example, there can just be one position limiting structure 123, first hinge 14, second hinge 15 and third hinge 16 that are disposed on the middle of the outer edges of the first plate 11, the second plate 12 and the swinging plate 13 respectively.

To conclude, the tiltable linkage mechanism of the present invention may have the following features.

1. The tiltable linkage mechanism may connect with the upper half and the lower half of the body of the hand-held device so that one of the halves can be tilted, closed or slidable.

2. It is easy to reduce the volume of the tiltable linkage mechanism without having a difficult manufacturing process.

3. Because there are more contact surfaces that exist between the position limiting structure and the end portion of the third hinge, there are no serious abrasions that occur between the position limiting structure and the end portion, thus enhancing the reliability of the position limiting structure or the end portion.

4. Compared to the conventional hinge structure, the tiltable linkage mechanism can occupy less space on the circuit board.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:
1. A tiltable linkage mechanism, comprising:
a first plate including a first upper surface and a first bottom surface opposite to the first upper surface;

a second plate including a second upper surface, a second bottom surface opposite to the second upper surface, and a position limiting structure, wherein the second bottom surface faces towards the first upper surface of the first plate, and the position limiting structure is disposed on the second bottom surface and has two opposite clamping surfaces;

a first hinge pivotally connected with the second plate and the first plate;

a swinging plate;

a second hinge pivotally connected with the swinging plate and the first plate; and a third hinge disposed within the position limiting structure to pivotally connect with the swinging plate and the second plate, wherein the third hinge has an end portion slidably clamped by the two clamping surfaces;

whereby when the second plate is tilted from the first plate, the second plate rotates about the first hinge, the swinging plate rotates about the second hinge, and the end portion of the third hinge slides within the position limiting structure from a first position to a second position;

wherein the position limiting structure includes a cantilever plate and a protrusion opposite to the cantilever plate, the cantilever plate and the protrusion form the two clamping surfaces respectively to define a clamping space, and the position limiting structure is in an inverted-U-shaped configuration;

wherein the position limiting structure extends downward from the second bottom surface toward the first upper surface, the cantilever plate is resiliently biased in a direction toward the second bottom surface, and the clamping surface of the cantilever plate is located between the second bottom surface and the first upper surface; and wherein at least one of the two clamping surfaces is formed with a plurality of stopping grooves for the end portion of the third hinge to optionally slide thereon.

2. The tiltable linkage mechanism of claim 1, wherein the first hinge is defined with a first axis, the second hinge is defined with a second axis, and the third hinge is defined with a third axis, in which the first axis, the second axis and the third axis are substantially parallel.

3. The tiltable linkage mechanism of claim 1, wherein the third hinge is made of metal and the protrusion is made of plastic.

4. The tiltable linkage mechanism of claim 1, wherein the cantilever plate is made of metal.

5. The tiltable linkage mechanism of claim 1, wherein one of the two clamping surfaces is the second bottom surface.

6. The tiltable linkage mechanism of claim 1, wherein the swinging plate has a notch for receiving the end portion of the third hinge and the position limiting structure when the second plate rotates with respect to the first plate to a closed state.

7. The tiltable linkage mechanism of claim 1, wherein the first plate has a notch for receiving the swinging plate when the second plate rotates with respect to the first plate to a closed state.

8. The tiltable linkage mechanism of claim 1, further comprising a sliding plate which is slidably disposed on the second upper surface of the second plate.

* * * * *